United States Patent
Landi et al.

[11] Patent Number: 5,840,400
[45] Date of Patent: Nov. 24, 1998

[54] PERFORATED CORE HONEYCOMB PANEL SYSTEM

[75] Inventors: Curtis L. Landi; Susan L. Wilson, both of Sunnyvale, Calif.

[73] Assignee: Supracor Systems, Inc., Calif.

[21] Appl. No.: 974,474

[22] Filed: Nov. 12, 1992

Related U.S. Application Data

[63] Continuation-in-part of Ser. No. 717,523, Jun. 19, 1991, Pat. No. 5,180,619, which is a continuation-in-part of Ser. No. 446,320, Dec. 4, 1989, Pat. No. 5,039,567.

[51] Int. Cl.$^6$ .................................................. B32B 3/12
[52] U.S. Cl. .................... 428/116; 52/793.1; 428/131; 493/966
[58] Field of Search .................... 428/116, 118, 428/911, 131; 52/806, 793.1; 156/156, 197, 292; 493/966

[56] References Cited

U.S. PATENT DOCUMENTS

| | | | |
|---|---|---|---|
| 2,887,425 | 5/1959 | Holland | 428/116 X |
| 3,018,205 | 1/1962 | Barut | 428/116 |
| 3,483,070 | 12/1969 | Kennedy et al. | 428/118 |
| 3,556,917 | 1/1971 | Eakin et al. | 428/118 X |
| 3,895,152 | 7/1975 | Carlson et al. | 428/116 |
| 4,136,222 | 1/1979 | Jonnes | 428/116 |
| 4,421,811 | 12/1983 | Rose et al. | 428/116 |
| 4,422,183 | 12/1983 | Landi et al. | 428/116 X |
| 4,485,568 | 12/1984 | Landi et al. | 428/116 X |
| 5,039,567 | 8/1991 | Landi et al. | 428/116 |
| 5,134,790 | 8/1992 | Woitschaetzke et al. | 428/116 X |
| 5,180,619 | 1/1993 | Landi et al. | 428/116 |

*Primary Examiner*—Henry F. Epstein

[57] ABSTRACT

Perforated core honeycomb panel and pump system including a panel comprised of a core of perforated, thermoplastic elastomeric honeycomb bonded to and disposed between upper and lower sheets of thermoplastic elastomeric facing material. The core is made from a plurality of advanced grade, thermoplastic elastomeric strips that have been perforated, such that there is a matrix of small holes formed in the core walls. The strips are intermittently fusion welded or bonded to form a stack which can be expanded to form a honeycomb-like network of cells. The upper and lower facing sheets are bonded to the core and extend outwardly beyond the core, and are sealed around their perimeters so as to form a closed chamber which is hermetically sealed and adapted to contain a suitable gas. In one embodiment, the chamber is communicatively coupled, via a conduit, to an exhaust valve and a bulb pump in order to permit the gas contained within the chamber to be selectively increased or decreased in pressure or volume. The material from which the core and/or facing sheets are made may be plain or reinforced with suitable materials such as fabrics or fibers. In an alternative embodiment, the bulb pump may be replaced by another panel such that gas may be exchanged between panels.

22 Claims, 7 Drawing Sheets

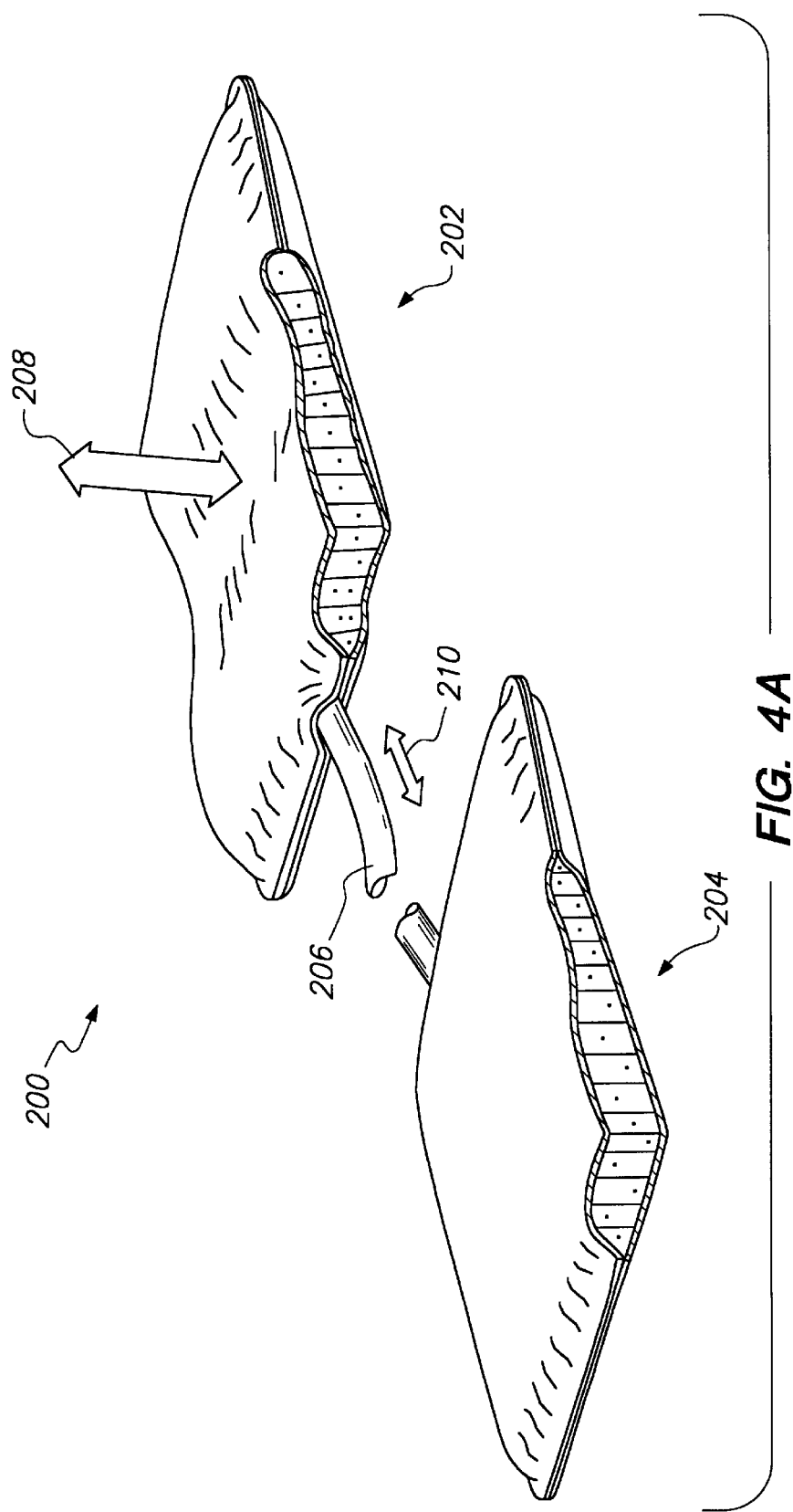

PERFORATED CORE HONEYCOMB PANEL SYSTEM

This application is a continuation-in-part of our U.S. application Ser. No. 07/717,523 filed Jun. 19, 1991, now U.S. Pat. No. 5,180,619, entitled "PERFORATED HONEYCOMB", which is a continuation-in-part of our prior U.S. Ser. No. 446,320 filed Dec. 4, 1989 now U.S. Pat. No. 5,039,567 entitled "Resilient Panel Having Anisotropic Flexing Characteristics And Method Of Making Same."

BACKGROUND OF THE INVENTION

1. Field of the Invention

The present invention relates generally to thermoplastic honeycomb panels, and more particularly to such panels having perforations in the walls of the honeycomb core and nonperforated facing materials enveloping the core and sealed to entrap gas or fluid within the panel. Means are also included for altering the volume or pressure of the entrapped gas.

2. Brief Description of the Prior Art

Early honeycomb panels were made from rigid materials which were both strong and lightweight. These materials, when crushed, did not exhibit good recovery and in many cases became permanently deformed. See, for example, the U.S. Patents to Barut U.S. Pat. No. 3,018,205, Eakin et al. U.S. Pat. No. 3,556,917, and Kennedy et al. U.S. Pat. No. 3,483,070.

Applications of honeycomb panels made from resilient materials are disclosed in U.S. Patents to Holland U.S. Pat. No. 2,887,425 and Landi et al. U.S. Pat. Nos. 4,422,183 and 4,485,568. Resilient honeycomb is made from elastomeric strips that are intermittently bonded together, with adhesives, at staggered intervals along the lengths of the strips. The plastic material provides resiliency so that the honeycomb returns to its original shape following deformation. However, panels fabricated from adhesive bonded plastic strips are expensive and difficult to manufacture in quantity due to the complexities associated with the adhesive bonding and assembly techniques required. Furthermore, such panels are subject to mode bond failures due to adhesive peel problems. Node bond integrity is an important feature in almost all applications.

Landi et al. in U.S. Pat. No. 5,039,567 discloses a method of manufacturing thermoplastic elastomeric strips into flexible honeycomb panels. In Landi, the strips are bonded together using a thermal fusion bonding technique rather than adhesive bonding.

The resilient honeycomb of the early prior art panels consisted of whole or non-perforated strips of intermittently bonded plastic that were stretched open to create the core. Facing sheets were made from whole material and bonded to the planar surfaces created by the wall edges of the honeycomb core. The benefits of perforating the core walls and/or facing sheets had not been fully recognized. Perforating the thermoplastic core walls and/or facings changes the response characteristics of the panel. The panel's shock absorption capability is increased and its sound attenuation and thermal insulation capabilities are enhanced.

In FIG. 1, a prior art honeycomb panel 10, used as a shock-absorbing cushion or pad, is shown. In this panel, a honeycomb core 12 includes cell walls 13 with a plurality of perforations 14. A top facing sheet 16 and the bottom facing sheet 17 do not have any perforations formed therein. A force applied to the top of the panel, as suggested by an arrow 18, will cause the panel to be compressed, tending to drive the air within the compressed cells of the core 12 outwardly as indicated by arrows 20. If the holes or perforations 14 in the core material are small, they will tend to throttle the flow of escaping air and thereby absorb the shock of the applied force. The shock-absorbing characteristics of the pad are thus determined by both the resiliency of the thermoplastic materials and the number and size of the perforations.

Woitschaetzke et al., in U.S. Pat. No. 5,134,790, discloses the application of a similar type of perforated core honeycomb panel in shoes. A recess formed in the midsole extends over substantially the entire surface of the midsole, front-to-back and side-to-side, such that only a peripheral edge remains. A honeycomb panel shaped to conform to the recess is inserted therein and a facing is adhered to the core. Woitschaetzke indicates that the sole can be airtight, in which case air can move from cell to cell as deforming pressure is applied thereto, or apertures can be provided in the facings or sidewalls, so that the air can be exhausted and drawn back in as the panel is deformed. In an alternative embodiment, two distinct and separate recess areas are formed in the midsole. A first recess is formed in the ball area and is shaped to contain a perforated core honeycomb panel, while another recess is formed in the heel area and likewise contains a perforated core honeycomb panel.

There are disadvantages associated with the concept disclosed by Woitschaetzke et al. For example, the honeycomb panel is designed as a homogeneous molded article. However, no disclosure of the manufacturing process is given. Moreover, a molded honeycomb panel is very complex and therefore costly and difficult to manufacture.

In addition, the alternate Woitschaetzke et al. embodiment uses discrete panels of honeycomb with no interconnection between the honeycomb panel located in the heel region and the panel located at the ball pad region of the midsole. It would be desirable to have the two panels interconnected so that, as the heel of the shoe strikes the ground, compressive forces exerted on the heel panel will force gases in the heel panel into the ball panel via an interconnection conduit. However, since there is no interconnecting conduit, there is no way for the gas to flow from one panel to the other to modulate the absorption properties of the panels.

Furthermore, Woitschaetzke et al. discloses no way to alter the pressure within the core and thereby increase the resiliency of the panel, or its shock absorption capability. Also, there is no way to compensate the thermoplastic core walls for creep and fatigue that over time leads to a degradation in panel performance (e.g., a slower rate of recovery of the walls after exposure to a compressive force).

In FIG. 2, a pump device, used in conjunction with a bladder, provides selectable shock absorption and cushioning capability. The bladder and pump system 100 includes a flexible bladder 102 and a bulb pump device 108 which are in fluid communication via a conduit 104. The bulb pump may be used to pressurize an exhaust valve 106, installed in the conduit 104, allowing the system 100 to be vented to atmosphere; alternatively the valve 106 allows the pump 108 to draw a suction on the atmosphere in order to pressurize the bladder 102.

It will be appreciated from the figure that, if the bladder surface is compressed (under some external loading or pressure) or extended (due to increased pressure from the pump) as indicated by an arrow 110, the bladder expands or contracts in the directions of arrows 112 and 114.

The system 100 has disadvantages because of the drawbacks associated with the bladder structure. The bladder is essentially a flexible envelope having no means for controlling the manner and direction in which the entrapped gas moves. The bladder will expand freely, and compress in a direction governed solely by the direction of the compressive force applied to the bladder. The bladder is non-anisotropic; that is, there is very little if any directional control during bladder expansion or compression.

SUMMARY OF THE PRESENT INVENTION

It is therefore an object of the present invention to provide a perforated core honeycomb panel apparatus, fabricated of a resilient material, with enhanced flexibility, stability and support capabilities.

Another object of the present invention is to provide a resilient, perforated core honeycomb panel apparatus that conforms readily to body contours and curves.

Yet another object of the present invention is to provide a resilient, perforated core honeycomb panel apparatus having variable and controllable shock absorption capabilities.

Still another object of the present invention is to provide a resilient, perforated core honeycomb panel apparatus that is thin, flexible, and lightweight with adjustable thermal insulation capabilities.

Briefly, a preferred embodiment of the present invention includes a panel comprised of a core of perforated, thermoplastic elastomeric honeycomb bonded to and disposed between upper and lower sheets of thermoplastic elastomeric facing material. The core is made from a plurality of advanced grade, thermoplastic elastomeric strips that have been perforated, such that there is a matrix of small holes formed in the core walls. The strips are intermittently fusion welded or bonded to form a stack which can be expanded to form a honeycomb-like network of cells. The upper and lower facing sheets are bonded to the core and extend outwardly beyond the core, and are sealed around their perimeters so as to form a closed chamber which is hermetically sealed and adapted to contain a suitable gas. In one embodiment, the chamber is communicatively coupled, via a conduit, to an exhaust valve and a bulb pump in order to permit the gas contained within the chamber to be selectively increased or decreased in pressure or volume. The material from which the core and/or facing sheets are made may be plain or reinforced with suitable materials such as fabrics or fibers. In an alternative embodiment, the bulb pump may be replaced by another panel such that gas may be exchanged between panels.

A primary advantage of the present invention is that the selective addition or subtraction of gas to or from the enclosed chamber(s) can be used to vary the shock-absorbing, force-dissipating or structural characteristics of the panel or panels.

Another advantage of the present invention is that the selective addition or subtraction of gas to or from the enclosed chamber (s) will change the thermal insulation characteristics of the panel.

Still another advantage of the present invention is that when the gas is vented from the enclosed chamber, the panel can be compressed into a small volume, but with selective addition of gas, the panel can be re-expanded to surround a shape or contour, or can be re-expanded to some predetermined shape.

A still further advantage of the present invention is that at low temperatures a perforated core panel is more flexible than a non-perforated core panel.

These and the other objects and advantages of the present invention will no doubt become apparent to those skilled in the art after having read the following detailed description of the preferred embodiment illustrated in the several figures of the drawing.

BRIEF DESCRIPTION OF THE DRAWINGS

FIGS. 4A and 4B are partially broken away perspective depictions of alternative embodiments of the present invention having first perforated core honeycomb panels communicatively coupled to second perforated core honeycomb panels;

DESCRIPTION OF THE PREFERRED EMBODIMENT

Figure 1:
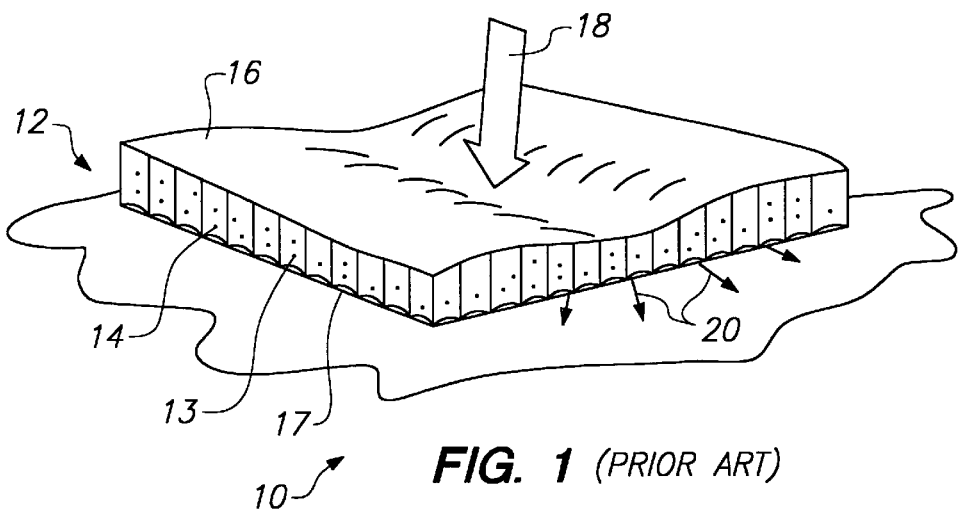
FIG. 1 shows a perspective view of a prior art block of perforated core honeycomb panel.
Figure 2:
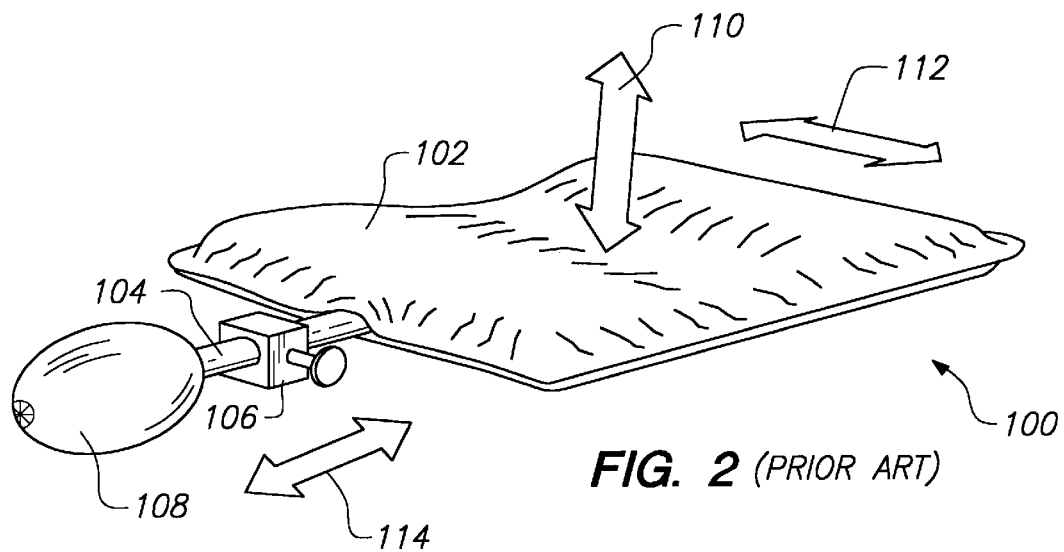
FIG. 2 depicts a prior art inflatable bladder in fluid communication with a bulb pump.
Figure 3:
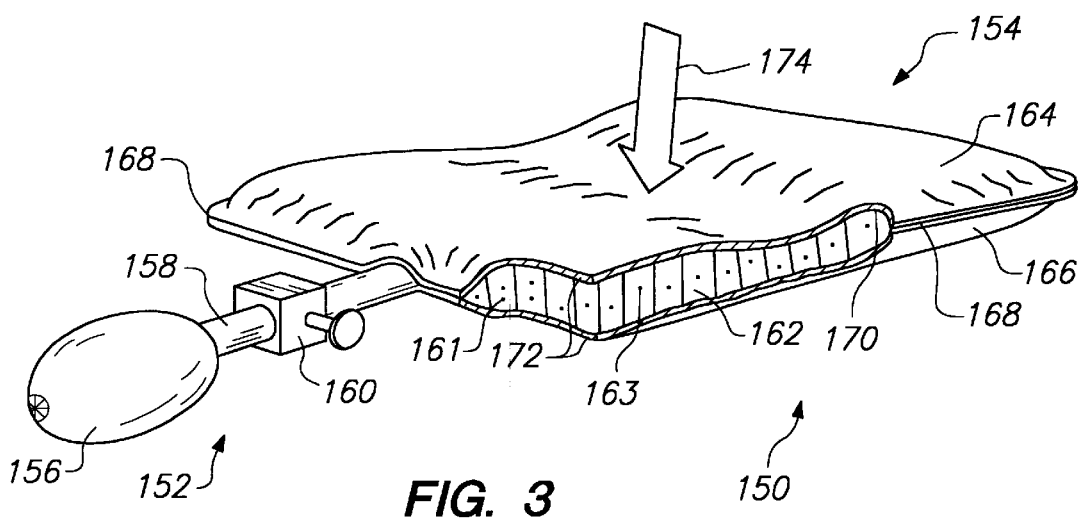
FIG. 3 is a partially broken away perspective depiction of a preferred embodiment of the present invention including a perforated core honeycomb panel communicatively coupled to a bulb pump.

Referring now to FIG. 3 which depicts at 150 a preferred embodiment of the present invention including a pump subsystem 152, and a perforated honeycomb panel subsystem 154.

The subsystem 154 includes a first facing sheet 164, a second facing sheet 166, and a flexible perforated honeycomb core 162. The core 162 is described in greater detail in the Applicant's copending application Ser. No. 07/717, 523 which is hereby incorporated by reference. The core 162 includes cell walls 161 with perforations 163 and is affixed to the inside surfaces of the first facing sheet 164 and the second facing sheet 166. The facing sheets extend outwardly beyond the core 162 and are bonded together around their perimeters as indicated at 168, so as to form a closed chamber 170 which is hermetically sealed and adapted to contain a suitable gas. For purposes of illustration, the chamber walls are broken away as indicated at 172.

In order to permit the gas contained within the enclosed chamber 170 to be increased or decreased in volume or pressure, the pump subsystem 152 is communicatively coupled to the chamber 170. The pump subsystem includes a bulb pump 156 that is coupled, via a conduit 158, to the chamber 170. As illustrated, the conduit 158 is attached to the perimeter 168 of the panel 155 forming chamber 170. An exhaust valve 160 is installed in the conduit 158 and allows the chamber 170 to be vented to atmosphere. As will be appreciated by those skilled in the art, the selective addition or subtraction of gas into or out from the enclosed chamber 170 will result in a change in the force-dissipating characteristics or shock-absorbing capabilities of the pad in response to applied forces such as those illustrated by the arrow 174. The operation of the preferred embodiment will be discussed in greater detail in the context of several applications as illustrated in FIGS. 6B, 6C, 6D, and 6E.

Referring now to FIG. 4A which is a partially broken depiction of an alternate embodiment of the present invention, a dual panel system 200 is shown including a first perforated core honeycomb panel 202 and a second perforated core honeycomb panel 204. The first panel 202 is communicatively coupled to the second panel 204 via conduit 206. It will be appreciated that the pressurization and thus the force-absorbing or dissipating characteristics of panel 204 will be varied in response to forces, such as illustrated by the arrow 208, applied to the panel 202. The operation of this embodiment will be discussed further in the context of the applications illustrated in FIGS. 6A and 6C.

Figure 4B:
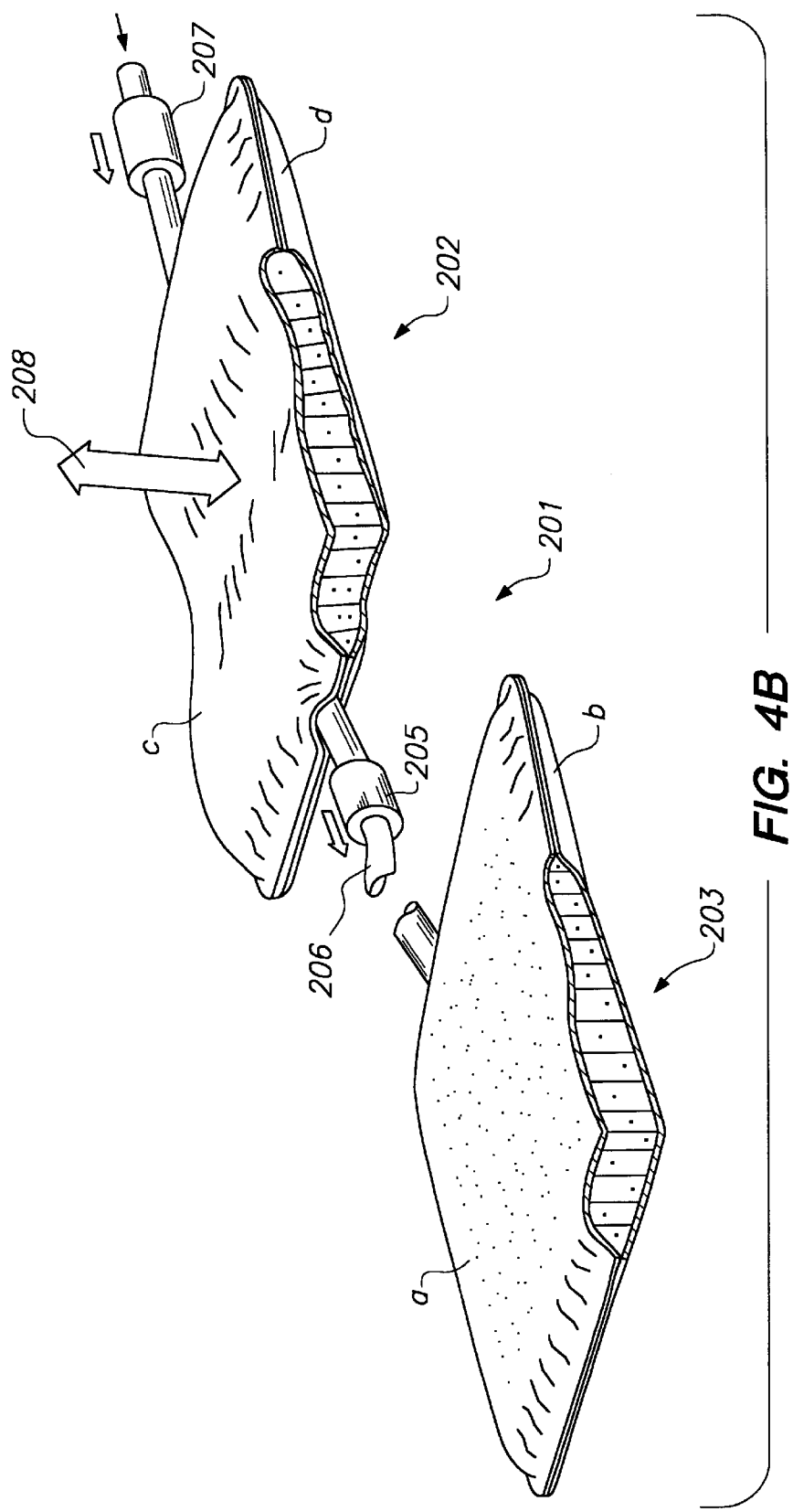

In FIG. 4B a modification of the embodiment shown in FIG. 4A is depicted at 201 and includes a pair of one-way check valves 205 and 207. In addition, at least one of the four face sheets "a"–"d" is perforated. As illustrated, only the face sheet "a" is perforated, either by forming small holes therein or by using a woven (or other type) fabric for the facing material. In the embodiment shown, the force 208 would tend to collapse the core and cause gas contained in panel 202 to exit through tube 206 and check valve 205 and enter panel 203. If the cell wall perforations are larger than the sheet perforations, then it would be expected that the increase in pressure in panel 203 would result in movement of the gas out of the core through the face sheet perforations. For example, the panel 202 might be the heel pad of a shoe and the panel 203 the corresponding ballpad. In such case, during walking (or running) heel force would result in a ventilation of the front portion of the foot followed by further ventilation as the balls of the foot load the ballpad 203. Release of the load force 208 would result in return of the pad to its uncompressed form drawing air thereinto through the check valve 207. Similarly, the pad 202 might form part of a chair (or wheelchair) cushion with the pad 203 forming another part. In this case a similar ventilating action would take place. In the latter case a slightly different effect might be obtained by turning the perforated cushion up-side-down.

Figure 5:
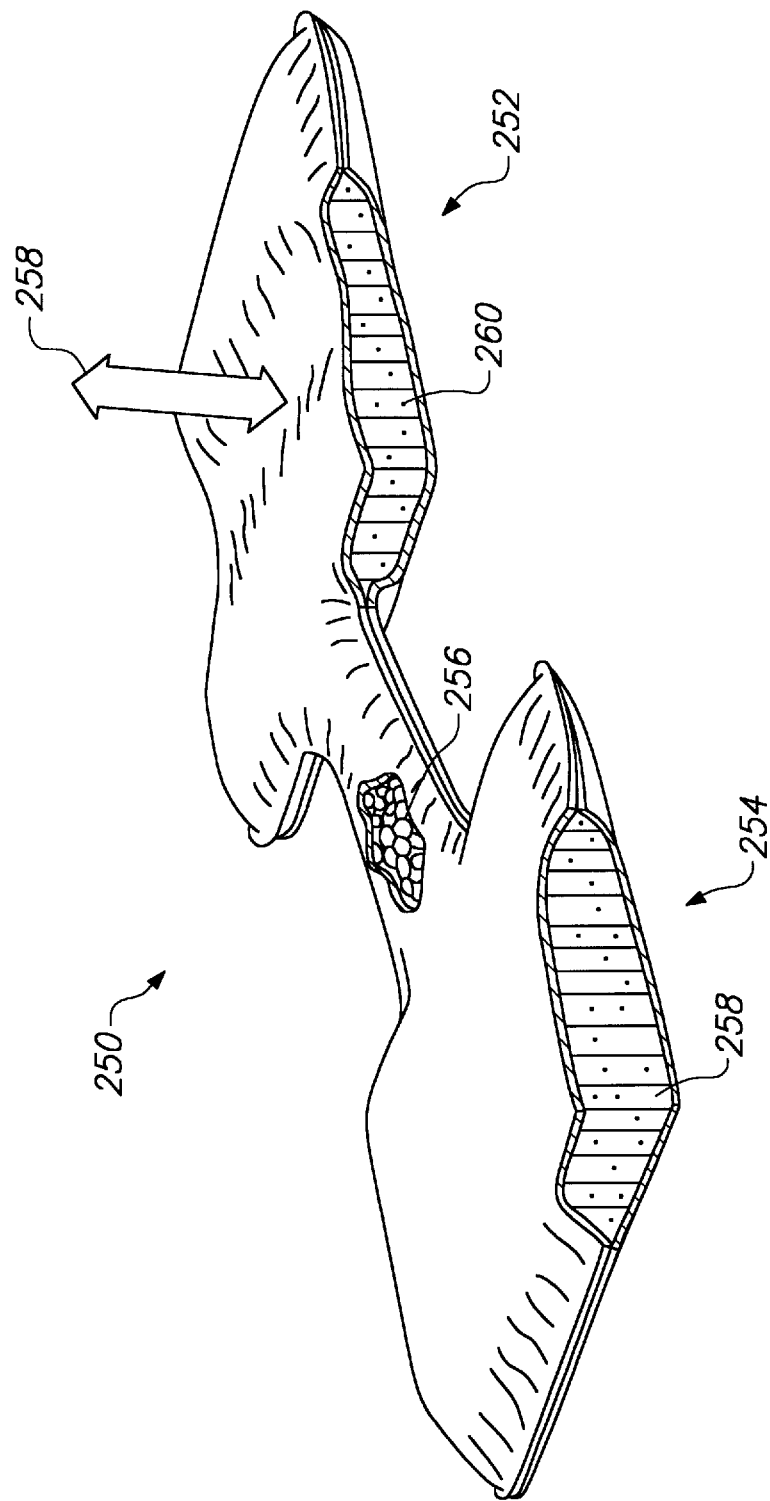
FIG. 5 is a partially broken away perspective depiction of another alternative embodiment of the present invention having a first perforated core honeycomb panel communicatively coupled to a second perforated core honeycomb panel having a different core size.

In FIG. 5, a partially broken depiction of yet another embodiment of the present invention, a mixed panel system 250, is shown. The system 250 includes a first perforated core honeycomb panel 252 having a relatively thick core thickness communicatively coupled, via a conduit section 256, cored or uncored, to a second perforated core honeycomb panel 254 having a relatively thin core thickness. In other words, in this embodiment, as illustrated, the panel 254 may have a perforated core with cell walls 258 taller than the cell walls 260 of the panel 252. Alternatively (not shown), the panels 252 and 254 may be identical panels, or one perforated core honeycomb panel could be communicatively coupled to a bladder-type device.

The force-dissipating characteristics of panel 254 will vary in accordance with the forces illustrated by an arrow 258, applied to the panel 252 and vice versa. The operation of this embodiment will be discussed further in the context of the application illustrated in FIGS. 6A and 6C. Note that the cores in each of the panels of FIGS. 4 and 5 serve to restrict the expansive deformation of the panels. In the compressive mode, the cores resiliently resist compression while the gas discharge through the perforations damps the compressive motion.

A panel of material provided in accordance with the present invention (as illustrated in FIGS. 3–5) can thus be used to support and provide shock absorption and/or vibration isolation between a vibrating mechanism, such as a motor or reciprocating actuator, and the surface upon which it rests. It can also be used to provide resilient padding for a wide variety of applications including furniture, auto seats, floor pads, body-engaging straps, seat belts, etc. Furthermore, a pad of the type depicted in FIG. 3 can be used to provide lightweight body protective padding such as might be used in various types of sportswear adapted to protect the body, feet, head and other bodily parts of the user. Note also that the same structure could be used to fashion a lightweight "blow-up" sleeping bag, vest, or other article of clothing for providing insulative warmth, the warmth-providing feature resulting from the insulative quality of the gas contained within the padding, while at the same time providing shock protection.

Figure 6A:
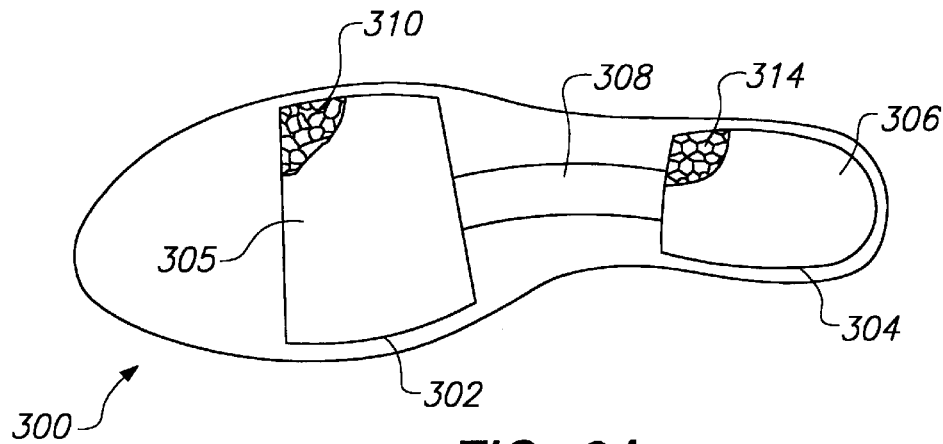
FIG. 6A is a partially broken away plan view of a shoe midsole embodiment of the present invention, having two communicatively coupled perforated core honeycomb panels contained within the recesses of a shoe midsole.

FIGS. 6A–6F illustrate several applications of the preferred and alternate embodiments of the present invention. Referring now to FIG. 6A, a shoe midsole 300 is depicted which includes a ball pad area recess 302 and a heel area recess 304. A perforated honeycomb panel 305 is disposed within the recess 302, while a second perforated honeycomb panel 306 is disposed within the heel area 304. The cores 310 and 314 are of the type illustrated in FIGS. 4 or 5 with the two panels being communicatively coupled via a conduit 308. The panels may be identical in thickness (as depicted in FIGS. 4A and 4B), cell size or structure, or they may be of dissimilar character (thickness, width, aspect ratio, size, aperture size and/or number, etc.), as illustrated in FIG. 5.

Through use of the interconnection conduit, gas can flow from one panel to another thereby altering the energy absorption properties of the respective panels. As the heel of the foot strikes the ground, compressive forces are exerted on the heel panel. Entrapped gas is thereby forced from the heel panel into the ball pad panel via the interconnection conduit 308. Thus, before the ball of the foot strikes the ground, the ball panel's shock absorption capability is bolstered by the pressurizing influx of gas. The process is reversed as gas is forced into the heel panel due to the compressive forces exerted on the ball panel as the user's weight is shifted forward. In this way, the shock-absorption characteristics of the midsole 300 are dynamically varied to accommodate the shifting weight of the shoe wearer as he walks or runs. Although "pumping" bladders have previously been used in shoes, modulation of the gas flow from heel to toe (and vice versa) has been determined solely by the characteristics of the coupling conduit. In contrast and in accordance with the present invention, gas flow in the panels 305 and 306 (and in the linking conduit 308 if a FIG. 5 embodiment is used) is regulated by the apertures in each cell wall. Furthermore, the honeycomb core structure prevents ballooning of the panels as load is applied thereto.

An additional advantage can also be obtained by carefully configuring the characteristics of the cored coupling segment 256 (FIG. 5). More specifically, by judiciously choosing the shape of the segment 256 and the airflow characteristics of the cells and apertures, a substantial arch-supporting feature can be provided. For example, the shape, stiffness, and/or time varying resiliency of the arch-supporting segment can be selected.

Figure 6B:
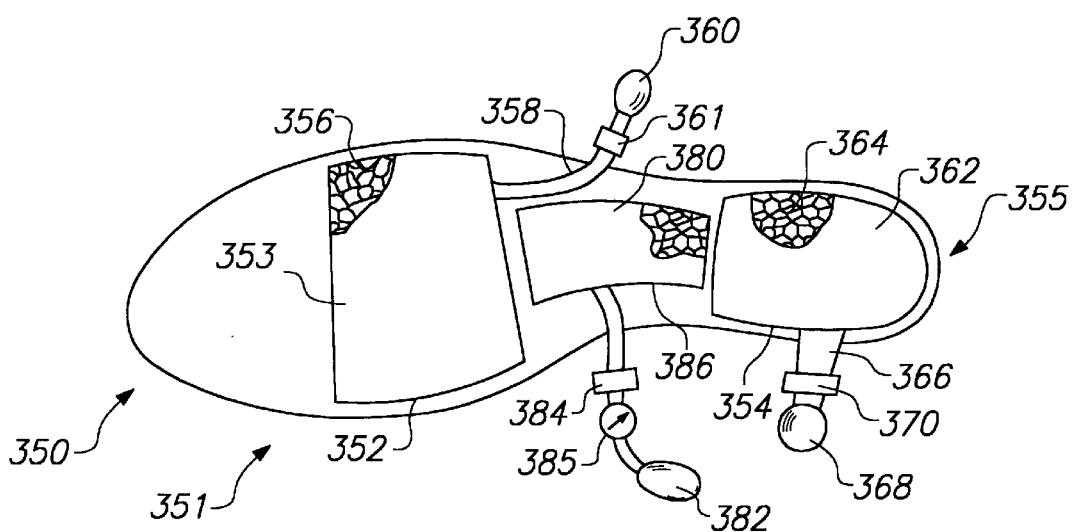
FIGS. 6B and 6C are views similar to FIG. 6A showing two applications of an embodiment of the present invention, having perforated core honeycomb panels, pumps and valves disposed within recesses formed in the heel, arch support, and/or the ball pad area of the midsole.

FIG. 6B illustrates another application of the perforated core honeycomb and pump system. In the application illustrated at 350, a midsole 351 is formed with two recessed areas: a ball pad area recess 352 and a heel area recess 354. Disposed within the recess 352 is a perforated honeycomb panel 356 having attached thereto a subsystem 360. Disposed within the recess 354 is a similar heel area panel 362 and pump subsystem 368. The subsystem 351 is similar to the system 150 (FIG. 3) and includes a panel 353 which is communicatively coupled, via a conduit 358, to a bulb pump 360. An exhaust valve 361 is installed in the conduit 358. The sealed panel 353 includes a perforated core 356. Although not depicted in the drawing, it will be appreciated that the illustrated pumps 360, 368, 382, and associated valves 361, 370, 384 can be located in any convenient place on the shoe with communication between pump and panel being accomplished by means of the conduits 358, 366 and the unnumbered tube joining valve 386 to panel 380. For example, as is now common in the popular "pump" basketball shoes, a small pumping bulb can be attached to the tongue of the shoe, or at a location on the ankle portion of the shoe, or at any other suitable location.

The subsystem 355 is also similar to the system 150 (FIG. 3) and includes a sealed heel panel 362 coupled, via a conduit 366, to a bulb pump 368. An exhaust valve 370 is installed in the conduit 366. The panel 362 includes a perforated core 364 as shown in the figure.

In operation, the wearer of the midsole 350 may vary the pressure or volume of one or both of the respective panels 356 or 362 through the use of the pump and valve devices 360, 361 or 368, 370, respectively. In this manner the wearer may customize the shock-absorption or force-dissipating characteristics of the ball and heel areas of the midsole, thereby maximizing comfort and shock-protection capability for the shoe wearer. For example, a heavier wearer may want to increase the pressure in the heel area to provide more cushioning. It will be appreciated that in the alternative only a heel or ball panel (but not both) may be disposed in the midsole.

In addition (or alternatively), a separate arch support panel 380, pump 382, valve 384 and gauge 385 may also be provided. The panel 380 would be positioned in a recess 386 and would be structurally configured such that its longitudinal rigidity (flexibility) could be selected as a function of the gas pressure in the panel. The gas pressure would be applied and controlled by the pump 382, valve 384 and gauge 385.

Figure 6C:
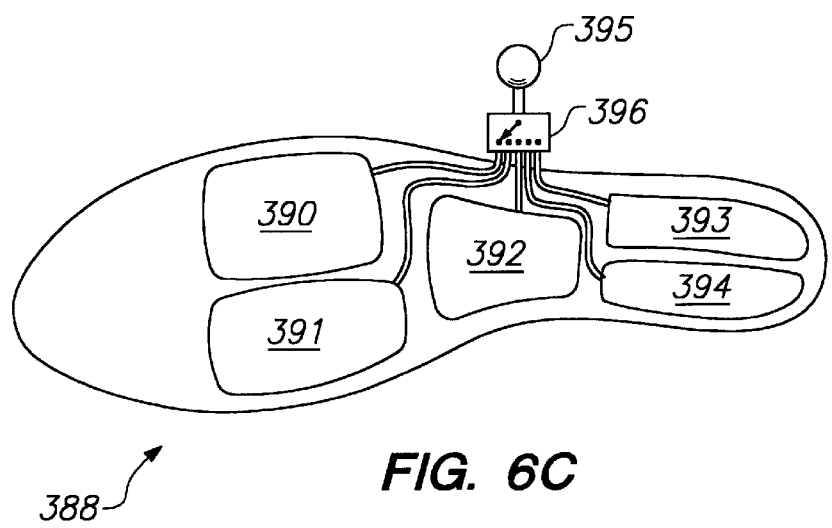

In FIG. 6C, still another embodiment 388, similar to that of FIG. 6B, is depicted which allows the pressure in any one or more of five independent honeycomb pads 390–394 to be selectively adjusted by means of a pump (or cartridge injection device) 395 and a 5-way selector valve 396. This embodiment will have particular utility for arch and pronation correction applications and the like wherein the second pads require different pressurizations to provide different levels of support.

Figure 6D:
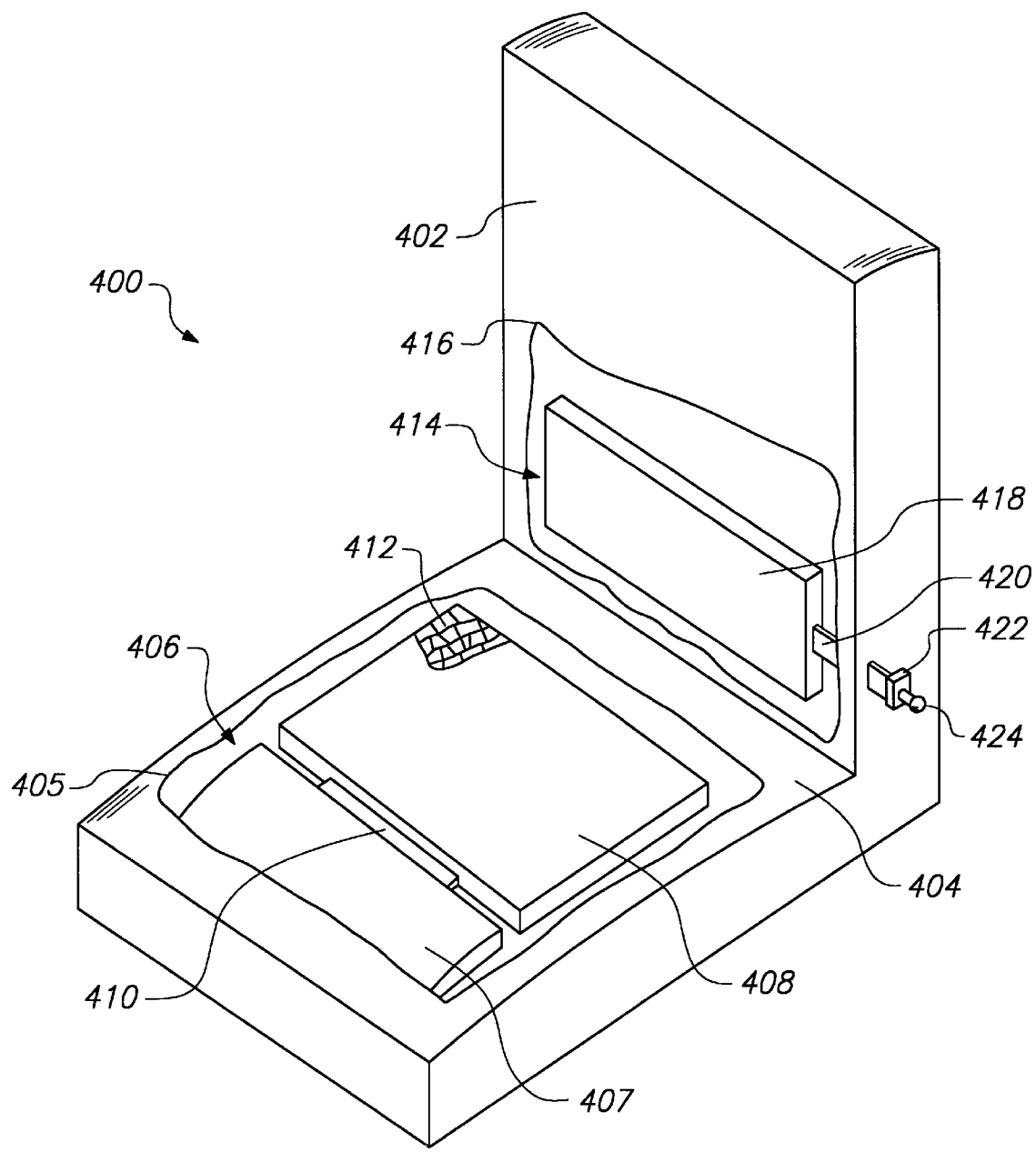
FIG. 6D is a partially broken away perspective view of an installation, of the embodiment illustrated in FIG. 4, into the seat portion of a typical chair; and shows the installation, of the embodiment shown in FIG. 3, into the lumbar section of the chair.

Referring now to FIG. 6D, a seat cushion 400 is illustrated that has been outfitted with a variety of panels characteristic of the preferred and alternate embodiments of the present invention. A dual honeycomb panel 406 is disposed in a seat rest area 404 of a seat cushion 400, and includes a panel 407 communicatively coupled via a conduit 410 to a second honeycomb panel 408. The honeycomb panels 407 and 408 include a flexible perforated honeycomb core 412. The dual panel 406 is similar to the system 200 (FIG. 4) or the system 250 (FIG. 5). The dual-panel seat cushion system 406 functions similarly to the midsole 300 (FIG. 6A) to maximize comfort for the user of the seat 404. The system allows gas contained within the panels to shift back and forth therebetween as the seat user shifts his/her weight. In addition, the system 406 accommodates the particular bodily contours of the user, thereby maximizing user comfort.

Also, as shown through a cutaway portion 416, a lumbar support panel assembly 414 is disposed within the seat back 402. The assembly 414 is similar to the system 150 (FIG. 3) and includes a panel 418 which is communicatively coupled, via a conduit 420, to a bulb pump 424. In addition, an exhaust valve assembly 422 is installed in the conduit 420. In operation, a user may vary the pressure or volume of the panel 418 by adding or subtracting gas to/from the panel via the pump 424 and valve assembly 422. In this manner, the support characteristics of the panel 418 may be adjusted to accommodate the particular needs of the user.

Figure 6E:
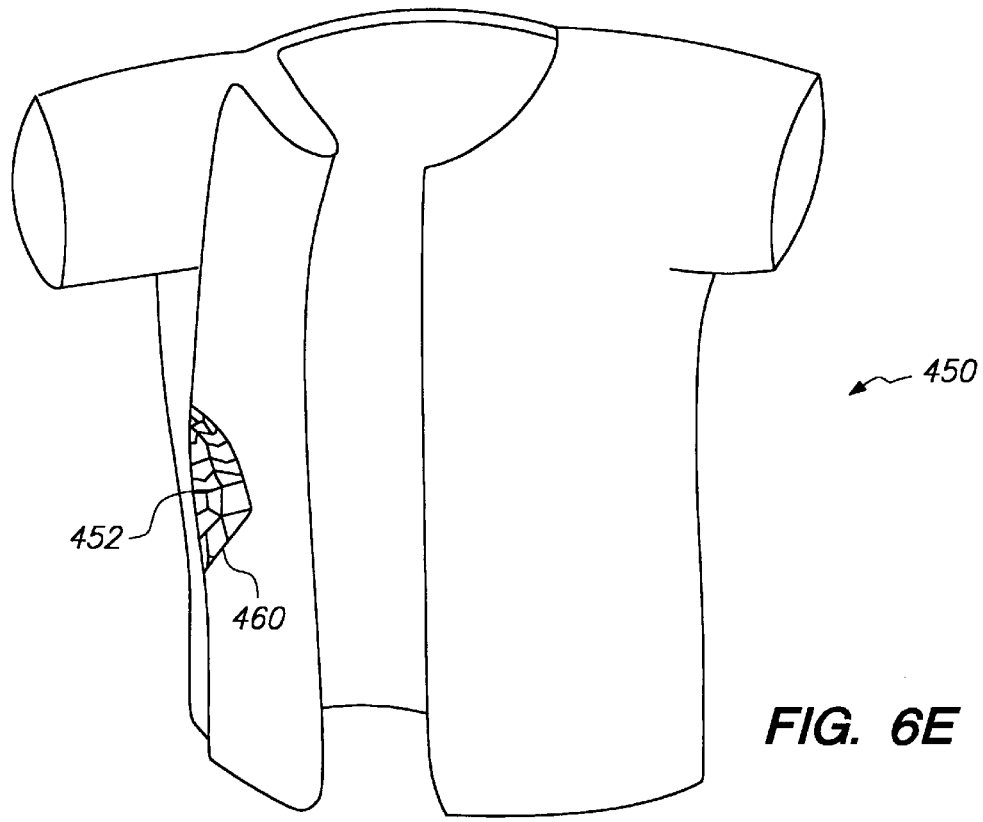
FIGS. 6E and 6F are partially broken away perspective views illustrating the use of the present invention as clothing material for wearing apparel, i.e. a vest.

Referring now to FIG. 6E, a vest 450 of a type typically worn as outerwear by hikers, hunters and the like is depicted. The vest may be fabricated from a sheet of perforated honeycomb materials either made to include, or having affixed thereto, "breathable" fabric such as GORE-TEX® or the like. In such embodiment, the resiliency of the honeycomb core would be relied upon to self-expand from a collapsed, storage configuration to its operable configuration, wherein the core cells are filled with air to provide thermal insulation.

In a similar application, namely a swimmer's wet suit, although the core would preferably be perforated, at least the outer facing sheet would not be perforated. The unperforated outer facing would serve to prevent water from entering the core cells. The inner facing can be unperforated or may be perforated, at least in part, to allow the user's skin to "breathe".

Figure 6F:
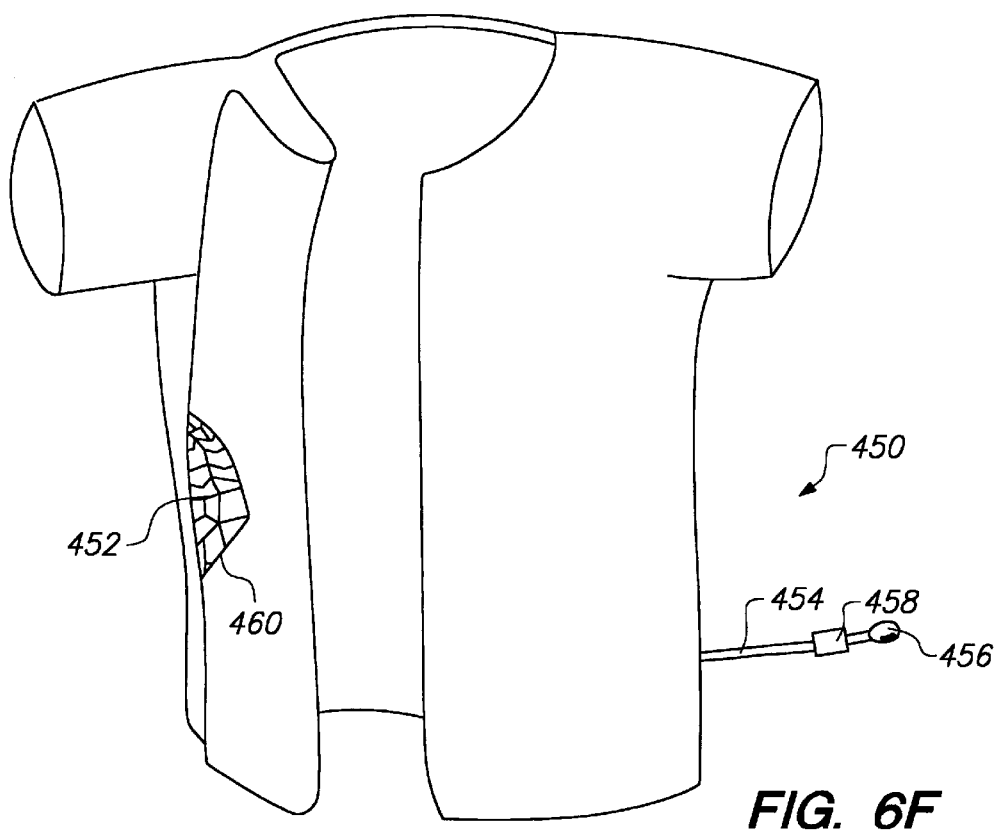

Referring now to FIG. 6F, in yet another configuration in accordance with the present invention, the honeycomb core structure may purposely be made structurally weak to accommodate ease of collapsibility (for storage, use comfort, etc.). In such case it may be desirable to make the facing sheets nonpermeable so that the device may be "inflated" to a selected pressurization. In such case one or more panels 452 would be fluid-communicable, via a conduit 454, with a suitable pump 456. A valve 458 is installed in the conduit 454 to close the panel(s) or allow the fluid contained therein to be exhausted. For clarity in understanding the application, the conduit 454, valve 458, and pump 456 are located as illustrated in the figure. However, it will be appreciated that the conduit, valve, and/or pump could be disposed in any inconspicuous location on the vest.

When not worn, the vest is collapsed by opening the exhaust valve and venting the panel core of any trapped gas. Thus, the vest weight is minimized, also the vest occupies a minimum volume when stowed in a carrying bag, backpack or other storage container. Minimizing the stowage weight and volume of the vest is highly desirable for hikers, climbers, and others.

When it is desired to wear the vest, the user can pressurize the panel core using the pump and valve devices. The vest will immediately expand from its compacted or stowed configuration to its "ready-to-wear" shape. The user will then have the vest properly expanded to fit his bodily contours. The user does not have to contend with the discomfort of a clinging or constricting vest while waiting for the vest to expand "naturally" (i.e. the vest material would expand to its non-stowed shape due to the elastic memory of the material).

It should be noted that although a vest has been illustrated in the figure, a wide variety of clothing apparel can be fabricated from such inflatable honeycomb panels. For example, wet suits for swimming and diving, can be fabricated from such panels and equipped with similar pump and valve (and gauge) devices. Thus, a wearer could increase the flotation, buoyancy, or insulation capability by increasing the volume of gas trapped within the honeycomb core. Also, such suits may be made thinner than conventional suits, thereby making them lighter and less bulky to store and transport. Suits similar to the vest discussed above can be inflated to quickly transform from its collapsed, stowable shape into its "ready-to-wear" shape. The transformation can of course occur on or off the wearers' body.

Although preferred and alternate embodiments of the present invention have been disclosed above, it will be appreciated that numerous alterations and modifications thereof will no doubt become apparent to those skilled in the art after having read the above disclosures. For example, other suitable techniques or processes of forming the honeycomb panels can be used. The panels may be configured in any appropriate shape, with various combinations of perforated and non-perforated core cells, and with corewall and/or facesheet perforations the number and/or hole size of which are tailored to achieve desired damping characteristics. It is therefore intended that the following claims be interpreted as covering all such alterations and modifications as fall within the true spirit and scope of the invention.

What is claimed is:

1. A honeycomb panel system comprising:
   a first panel including
      a first honeycomb core formed of undulated strips of resilient thermoplastic material, thermal compression bonded together to form cell walls defining a plurality of contiguous regularly shaped cells, the walls of at least some of said cells having perforations therein;
      a first facing sheet bonded to an upper surface of said core formed by the upper extremities of said cell walls; and
      a second facing sheet bonded to a lower surface of said core formed by the lower extremities of said cell walls, said first and second facing sheets being sealingly joined together about the perimeter of said core to provide a hermetically sealed chamber; and
      means fluid-communicatively coupled to said sealed chamber for selectively adding gas to or subtracting gas from said sealed chamber, said gas flowing through the perforations in the walls of said cells to change certain characteristics of said first panel.

2. A honeycomb panel system as recited in claim 1 wherein at least one of said facing sheets is of a resilient thermoplastic material and is thermal compression bonded to said core.

3. A honeycomb panel system as recited in claim 2 wherein said means for selectively adding gas to or subtracting gas from said sealed chamber includes a second panel having a closed chamber fluid-communicatively coupled to said sealed chamber of said first panel, said second panel including:
   a second honeycomb core formed of undulated strips of resilient thermoplastic material, thermal compression bonded together to form cell walls defining a plurality of contiguous regularly shaped cells, the walls of at least some of said cells having perforations therein,
   a third facing sheet bonded to an upper surface of said second honeycomb core formed by the upper extremities of said cell walls, and
   a fourth facing sheet having perforations formed therein, and being bonded to a lower surface of said second honeycomb core formed by the lower extremities of said cell walls, said third and said fourth sheets being sealingly joined together about the perimeter of said second honeycomb core to provide said closed chamber.

4. A honeycomb panel system as recited in claim 2 wherein said means for selectively adding gas to or subtracting gas from said sealed chamber includes means forming a second panel having a sealed chamber fluid-communicatively coupled to the sealed chamber of said first panel.

5. A honeycomb panel system as recited in claim 4 wherein said panel is configured to provide padding for a shoe.

6. A honeycomb panel system as recited in claim 4 wherein said second panel is structurally similar to said first panel.

7. A honeycomb panel system as recited in claim 6 wherein said panel is configured to provide padding for a shoe.

8. A honeycomb panel system as recited in claim 6 wherein at least one of the facing sheets of at least one of said panels has perforations therein.

9. A honeycomb panel system as recited in claim 4 wherein said first and second panels are fluid-communicatively coupled together by a third panel of structure similar to said first panel.

10. A honeycomb panel system as recited in claim 9 wherein said first, second and third panels are component parts of a unitary body.

11. A honeycomb panel system as recited in claim 9 wherein at least one of the facing sheets of at least one of said panels has perforations therein.

12. A honeycomb panel system as recited in claim 1 wherein said means for selectively adding gas to or subtracting gas from said sealed chamber includes a pump means and an associated valve means.

13. A honeycomb panel system as recited in claim 12 wherein said panel is configured to provide padding for a shoe.

14. A honeycomb panel system as recited in claim 12 and further comprising a second panel of similar structure to said first panel, said first and second panels being selectively coupled to said pump means and being configured to provide padding for a shoe.

15. A honeycomb panel system as recited in claim 1 wherein said panel is configured to form at least a part of an article of human clothing.

16. A honeycomb panel system as recited in claim 1 wherein said panel is configured to provide padding for a shoe.

17. A system of honeycomb panels, comprising:
   a first perforated core honeycomb panel forming a hermetically sealed first chamber for containing a quantity of fluid;
   a second perforated core honeycomb panel forming a hermetically sealed second chamber for containing a quantity of fluid; and
   conduit means for fluidly communicating said first chamber with said second chamber.

18. A system as recited in claim 17, wherein said first perforated core honeycomb panel includes:

a first honeycomb core formed of undulated strips of resilient thermoplastic material, thermal compression bonded together to form cell walls defining plurality of contiguous regularly shaped cells, the walls of at least some of said cells having perforations;

a first facing sheet including resilient thermoplastic material thermal compression bonded to an upper surface of said first core formed by the upper extremities of said cell walls, the bonding being accomplished by simultaneously applying heat and pressure to the joinder of said first facing sheet and said first core; and a second facing sheet including resilient thermoplastic material thermal compression bonded to a lower surface of said first core formed by the lower extremities of said cell walls, the bonding being accomplished by simultaneously applying heat and pressure to the joinder of said second facing sheet and said first core, said first and second facing sheets being sealingly joined together to provide said first chamber.

19. A system, as recited in claim 18, wherein said second perforated core honeycomb panel includes:

a second honeycomb core formed of undulated strips of resilient thermoplastic material, thermal compression bonded together to form cell walls defining plurality of contiguous regularly shaped cells, the walls of which have a plurality of perforations;

a third facing sheet including resilient thermoplastic material, thermal compression bonded to an upper surface of said second core formed by the upper extremities of said cell walls, the bonding being accomplished by simultaneously applying heat and pressure to the joinder of said third facing sheet and said second core; and a fourth facing sheet including resilient thermoplastic material thermal compression bonded to a lower surface of said core formed by the lower extremities of said cell walls, the bonding being accomplished by simultaneously applying heat and pressure to the joinder of said fourth facing sheet and said second core, said third and fourth facing sheets being sealingly joined together to provide said second hermetically sealed chamber.

20. A system, as recited in claim 17, wherein said conduit means includes:

a third honeycomb core formed of undulated strips of resilient thermoplastic material thermal compression bonded together to form cell walls defining plurality of contiguous regularly shaped cells, the walls of which have a plurality of perforations;

a fifth facing sheet of resilient thermoplastic material thermal compression bonded to an upper surface of said third core formed by the upper extremities of said cell walls, the bonding being accomplished by simultaneously applying heat and pressure to the joinder of said fifth facing sheet and said third core; and a sixth facing sheet of resilient thermoplastic material thermal compression bonded to a lower surface of said third core formed by the lower extremities of said cell walls, the bonding being accomplished by simultaneously applying heat and pressure to the joinder of said sixth facing sheet and said third core, said fifth and sixth facing sheets being sealingly joined together to provide a third hermetically sealed chamber fluid-communicatively coupled to said first and second chambers.

21. A system as set forth in claim 17, wherein said first perforated core honeycomb panel further includes means communicatively coupled to said first chamber for selectively adding gas to or subtracting gas from said first chamber to change the dampening or force-dissipating characteristics thereof.

22. A system as recited in claim 21 wherein said means for selectively adding gas to or subtracting gas from said first chamber includes a pump means and an associated valve means.

* * * * *